(12) United States Patent
Nighswander et al.

(10) Patent No.: US 10,801,664 B1
(45) Date of Patent: Oct. 13, 2020

(54) ARTICULATING SENSOR BRACKET

(71) Applicant: Swivel-Link, LLC, Hicksville, OH (US)

(72) Inventors: Anthony R. Nighswander, Hicksville, OH (US); Roger W. Sanders, Antwerp, OH (US); Chad A. Sprow, Continental, OH (US)

(73) Assignee: Swivel-Link, LLC, Hicksville, OH (US)

( * ) Notice: Subject to any disclaimer, the term of this patent is extended or adjusted under 35 U.S.C. 154(b) by 0 days.

(21) Appl. No.: 16/373,869

(22) Filed: Apr. 3, 2019

(51) Int. Cl.
*F16M 13/02* (2006.01)
*F16M 13/00* (2006.01)

(52) U.S. Cl.
CPC ........ *F16M 13/022* (2013.01); *F16M 13/005* (2013.01)

(58) Field of Classification Search
CPC ............................. F16M 13/022; F16M 13/005
USPC ......... 248/276.1, 296.11; 362/370, 432, 421, 362/419, 418
See application file for complete search history.

(56) References Cited

U.S. PATENT DOCUMENTS

| | | | | |
|---|---|---|---|---|
| 2,265,792 A * | 12/1941 | Ward | ...................... | F21V 21/22 362/396 |
| 3,096,962 A * | 7/1963 | Meijs | ..................... | B23Q 1/285 248/276.1 |
| 3,778,610 A * | 12/1973 | Wolf | ....................... | F21V 21/26 362/418 |
| 4,419,721 A * | 12/1983 | Gregoire | ................ | B60Q 1/245 362/269 |
| 4,767,231 A * | 8/1988 | Wallis | ................... | F16C 11/106 248/276.1 |
| 5,624,198 A * | 4/1997 | Fuchs | ..................... | F16C 11/06 248/278.1 |
| 5,730,522 A * | 3/1998 | Wyke | ..................... | F21V 19/00 248/200 |
| 5,951,191 A * | 9/1999 | Schroeder | ................ | G01P 1/00 403/110 |
| 8,579,478 B2 * | 11/2013 | Cristoforo | ................ | A42B 3/04 362/106 |
| 9,415,520 B2 | 8/2016 | Sanders et al. | | |
| 2001/0032497 A1* | 10/2001 | Schroeder | .............. | B60R 11/00 73/114.26 |
| 2002/0084396 A1* | 7/2002 | Weaver | .................. | F16M 11/10 248/278.1 |
| 2003/0230689 A1* | 12/2003 | Palfenier | ................. | G01P 1/026 248/309.1 |

(Continued)

*Primary Examiner* — Muhammad Ijaz
(74) *Attorney, Agent, or Firm* — Taylor IP, P.C.

(57) ABSTRACT

An articulating sensor bracket having a generally cylindrical member with a first end and a second end. The cylindrical member having a longitudinally extending through bore defining a longitudinal axis. The first end defines a ball arrangement and the second end defines a mounting surface. The mounting surface is generally parallel to the longitudinal axis. A bracket has a first leg and a second leg with the first leg disposed generally perpendicular to the second leg. The first leg includes a mounting hole and an arcuate slot extending partially around the mounting hole. The second leg includes a sensor mounting hole. A first fastener is disposed within the mounting hole and is coupled with the mounting surface. A second fastener is disposed within the arcuate slot and is coupled with the mounting surface.

13 Claims, 4 Drawing Sheets

(56) References Cited

U.S. PATENT DOCUMENTS

| | | | |
|---|---|---|---|
| 2012/0218770 A1* | 8/2012 | Mao | F21V 21/00 362/418 |
| 2013/0027923 A1* | 1/2013 | Ramirez | F21S 8/036 362/208 |
| 2013/0114275 A1* | 5/2013 | Cristoforo | A42B 3/044 362/396 |
| 2019/0249402 A1* | 8/2019 | Whitfield | E03C 1/066 |

* cited by examiner

ARTICULATING SENSOR BRACKET

BACKGROUND OF THE INVENTION

1. Field of the Invention

The present invention relates to a bracket, and, more particularly, to a bracket for positioning a sensor.

2. Description of the Related Art

Brackets used to mount devices such as sensors, cameras and lights for the automation and manufacturing environments are known to be provided in permanently installed, non-adjustable positions where the mounting angle, installation position and installation distance are fixed. In some situations, the bracket may be disassembled and then reconfigured to have an alternate mounting angle, installation position or installation distance. In many occasions a device must be precisely fixed, such as when using a proximity switch, a high speed imaging camera or a laser measurement system. Brackets having high precision mounting holes to properly place a sensor, camera or light are costly to manufacture and may result in many singular brackets to meet the various setups required in typical automation and manufacturing environments. Furthermore, many of the known brackets do not allow for small adjustments typically required due to variation from machining and manufacturing processes used to create the bracket.

U.S. Pat. No. 9,415,520, assigned to the assignee of the present invention, is directed to a swivel link assembly for the mounting end of arm tooling. The swivel link assembly includes a flexible ball base connected to the end of the robotic arm, and a knuckle joint defining at least one adjustable axis. The flexible ball base is able to swivel relative to the adjustable axis. An adapter has a proximal end and a distal end, with the proximal end connected to the flexible ball base, and an end-effector connected to the distal end. The swivel link assembly disclosed in the '520 patent can also be used to carry and position various types of sensors, cameras, lights, etc.

What is needed in the art is a device to simplify positioning of sensors.

SUMMARY OF THE INVENTION

The invention in one form is directed to an articulating sensor bracket assembly having an L-shaped bracket and a generally cylindrical member attached to the L-shaped bracket. The cylindrical member includes a first end and a second end and a longitudinally extending through bore defining a longitudinal axis. The first end defines a ball arrangement and the second end defines a mounting surface. The mounting surface is disposed generally parallel to the longitudinal axis. An L-shaped bracket includes a first leg and a second leg. The first leg is disposed generally perpendicular to the second leg. The first leg includes a mounting hole and an arcuate slot extending partially around the mounting hole. The second leg includes a sensor mounting hole. A first fastener is disposed within the mounting hole and is coupled with the mounting surface. A second fastener is disposed within the arcuate slot and is coupled with the mounting surface.

In yet another exemplary embodiment, there is shown a method for positioning a sensor. The method generally includes the steps of providing a sensor, an articulating mounting device and a base configured to engage a ball arrangement and a mounting surface. Mounting the sensor to the articulating mounting device. Guiding a sensor cable through the articulating mounting device and the base. Engaging the ball arrangement with the base. Mounting the base to a mounting surface and adjusting for positioning.

An advantage of the present invention is a greater degree of rotation about two separate pivot points with protection from wire pinching.

Another advantage of the present invention is the ability to mount multiple sizes of sensors on one of two sides of the L-shaped bracket.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
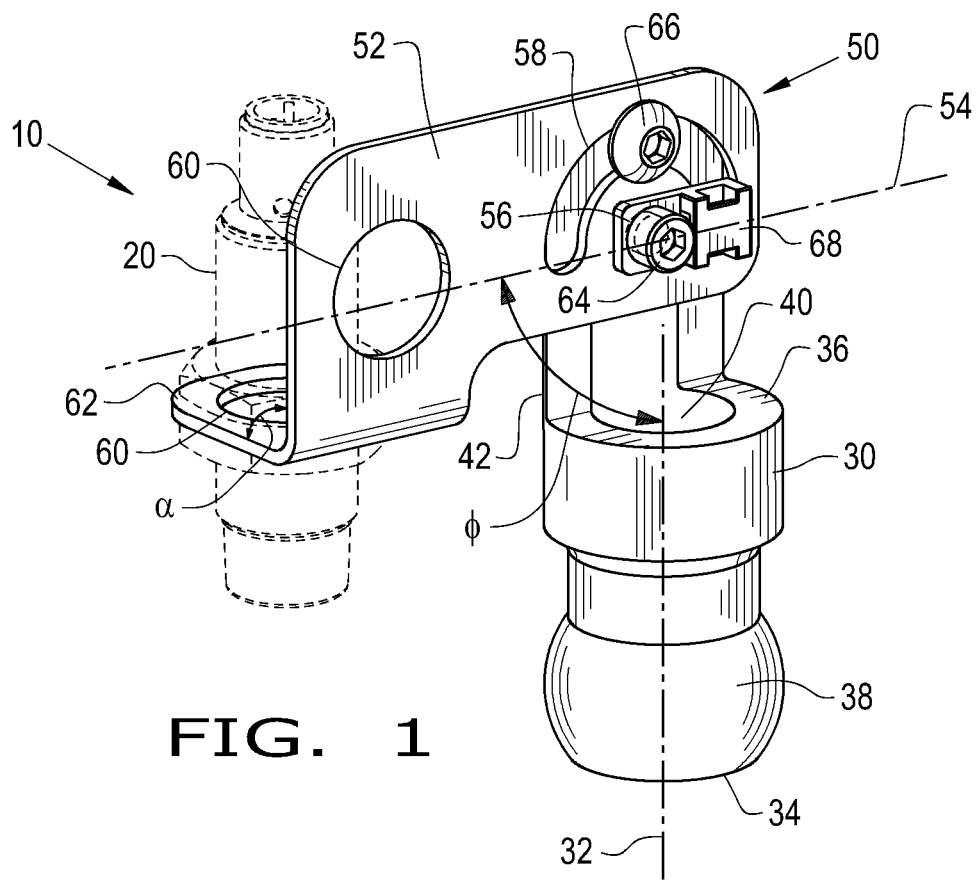
FIG. 1 is a perspective view of an embodiment of an articulating sensor bracket assembly of the present invention.

Referring now to the drawings, and more particularly to FIG. 1, there is shown an articulating sensor bracket assembly 10 for a sensor 20 used in automation and manufacturing environments. The articulating sensor bracket assembly 10 generally includes a cylindrical member 30, an L-shaped bracket 50, a pivoting point 64 and a pivoting locking member 66.

The cylindrical member 30 generally includes a body 31 with an outer surface 31A.

The outer surface 31A is shown as having a cylindrical shape although it may include any shape, e.g. angular or conical. The outer surface 31A may be a smooth or rough and may have a cross section consistent or varying along its' length. The body 31 further includes a longitudinal axis 32 that aligns from a first end 34 to a second end 36 of the body 31. The second end 36 of the body 31 forms an at least partial sphere 38 made up any portion of a sphere but is generally shaped and sized to function as a ball joint with a knuckle joint. A typical size of the at least partial sphere 38 is 0.73"-1.25" if configured for English units and 18.5 mm-28.5 mm if configured for SI units. It is to be understood that the at least partial sphere 38 may be of any suitable size for use with a knuckle joint but is generally configured to provide 160 degrees of rotation without pinching any cables, lines or any other type of link that passes through the joint. An internal through bore 40 runs from the first end 34 to the second end 36 and has the longitudinal axis 32 as its' central point. The internal through bore 40 can be configured to allow cables, lines or any other type of link to pass through thereby providing shielding from physical damage.

A knuckle joint, such as known by U.S. Pat. No. 9,415,520, may be provided to interface with the at least partial sphere 38. The knuckle joint 28 forms a cylindrical sleeve which partially covers the at least partial sphere 38. The knuckle joint has holes or the like through which fasteners may be inserted to tighten or loosen the connection between the knuckle joint and any ball bases.

The body 31 includes at least one extension 42 projecting from the first end 34 of the body 31. The at least one extension 42 terminates at a distal end and may form a portion of the internal through bore 40. An extension outer surface 31A generally aligns with the outer surface 31A of the body 31. The at least one extension 42 may have a cross section similarly shaped to the cross section of the body 31. The cross section of the at least one extension 42 may be the full cross section of the body 31 or may only make up a portion. It is to be understood that the at least one extension 42 may be formed integral with the body 31 or may be a component that is assembled to the body 31. The body 31 and the at least one extension 42 may be made from any material suited to withstand tensile, compressive and/or impact forces along and traverse to the longitudinal axis 32 and may provide sufficient wear and chemical resistance. Typical materials include but are not limited to plastics, e.g. acrylonitrile butadiene styrene (ABS), nylon, polyether ether ketone (PEEK) or polyethylene terephthalate (PET). Typical materials may include metals, e.g. steel, aluminum, cast iron, powdered metal. Typical processes used to manufacture the body 31 and the at least one extension 42 may include but are not limited to: machining, casting, sintering, forging, injection molding or additive manufacturing. The body 31 and the at least one extension 42 may be the virgin color of the material used or may be altered either by dyeing, painting or anodizing.

The L-shaped bracket 50 includes a first leg 52 having a top surface, a bottom surface, a first edge, a second edge, a third edge and a fourth edge. The first edge and the second edge are essentially parallel. The third edge and the forth edge are essentially parallel with the first edge and the third edge being traverse to each other. The first leg 52 forms a centerline 54 running essentially parallel to and disposed between the first edge and the second edge. The first leg 52 further includes a mounting hole 56. An arcuate slot 58 is formed from the top surface 52 to the bottom surface 54 and is arranged to be essentially concentric with the mounting hole 56. At least one mounting point 60 may be provided at an end opposite to the end having the mounting hole 56 and arcuate slot 58 and generally extends from the top surface to the bottom surface. The at least one mounting point 60 may be of any shape or size suitable for mounting devices, e.g. sensors. The at least one mounting point 60 is shown as a circular opening having a diametric size of 0.315"-1.18" for English devices and 8 mm-30 mm for SI devices.

The L-shaped bracket 50 may also include a second leg 62 extends away from a portion of the second edge of the first leg 52. As shown, the second leg 62 extends away from the second edge and aligns with the top surface, the bottom surface and the third edge. The second leg 62 is arranged at an angle α to the bottom surface and is shown as being approximately 90°. However, it is to be understood that the angle α may be of any angle in relation to the bottom surface. The second leg 62 may be formed integral with the first leg 52 or may be an additional component added to the second member. The first leg 52 and the second leg 62 may be made from any material suited to withstand tensile, compressive and/or impact forces along and traverse to the centerline 54 and may provide sufficient wear and chemical resistance. Typical materials include but are not limited to plastics, e.g. acrylonitrile butadiene styrene (ABS), nylon, polyether ether ketone (PEEK) or polyethylene terephthalate (PET). Typical materials may include metals, e.g. steel, aluminum, cast iron, powdered metal, sheet metal. Typical processes used to manufacture the first leg 52 and the second leg 62 may include but are not limited to: machining, casting, sintering, forging, injection molding, additive manufacturing, stamping, or laser cutting. The first leg 52 and the second leg 62 may be the virgin color of the material used or may be altered either by dyeing, painting or anodizing.

At least one mounting point 60 may be provided and generally extends from the top surface to the bottom surface. The at least one mounting point 60 may be of any shape or size suitable for mounting devices, e.g. sensors. The at least one mounting point 60 is shown as a circular opening having a diametric size of 0.315"-1.18" for English devices and 8 mm-30 mm for SI devices.

The centerline 54 and the longitudinal axis 32 form a first angle (I) between when the first leg 52 is attached to a pivot point 64 near the distal end of the at least one extension 42. The first angle (I) as shown is at approximately 90°. The pivot point 64 is shown as a socket head cap screw passing through an opening (not shown) in the first leg 52 and threading into a threaded hole (not shown) on the at least one extension 42. It is to be understood that the pivot point 64 may be made of any configuration suitable for allowing the first leg 52 to pivot about the body 31 through the first angle (I), e.g. fastener, pin or bearing. As shown, the arcuate slot 58 provides approximately 180° of angular displacement. In other words, the centerline 54 of the first leg 52 may pivot approximately 180° relative to the longitudinal axis 32 of the cylindrical member 30. It should be understood that the allowable angular displacement may larger or smaller than 180° and is controlled in part by the length of the arcuate slot 58.

The pivoting locking member 66 aligns with the arcuate slot 58 and is configured to prevent, hinder or allow pivoting between the cylindrical member 30 and the first leg 52. As shown, the pivoting locking member 66 is a button head cap screw that threads into a threaded hole (not shown) on the at least one extension 42. Pivoting is prevented by tightening the button head cap screw into the threaded hole whereby the bottom surface of the first leg 52 is clamped with a clamp force to the at least one extension 42. Partially loosening the button head cap screw releases a portion of the clamp force and allows the first leg 52 to pivot with restriction through the first angle (I) relative to the longitudinal axis 32 of the cylindrical member 30. Fully loosening the button head cap screw releases the clamp force and allows the first leg 52 to pivot through the first angle (I) relative to the longitudinal axis 32 of the cylindrical member 30. It should be understood that the surfaces of the at least one extension 42 and the bottom surface 54 of the first leg 52 may be rough or smooth to hinder or facilitate pivoting. It should also be understood that the surfaces of the at least one extension 42 and the bottom surface of the first leg 52 may be provided with a plurality of ridges (not shown) for predetermined pivoting increments, for instance, 5° increments through the first angle φ. Furthermore, there may be materials added between the surfaces of the at least one extension 42 and the bottom surface 54 of first leg 52 to hinder or facilitate pivoting. For instance, a washer made of rubber to hinder pivoting or made of polyoxymethylene to facilitate pivoting. While the pivoting locking member 66 has been described with a button head cap screw, it should be understood that other methods of preventing, hindering or allowing pivoting may be used, such as a wave washer installed under the button head cap screw, a clamping lever, clamping screw, c-clamp, or a magnet. It should also be understood that preceding features may be available for configurations where the top surface is assembled to the at least one extension 42. It should be further noted that the pivot point 64 may work with the pivoting locking member 66 wherein the pivoting locking member 66 and the pivot point 64 require unclamping prior to pivoting of the first leg 52 relative to the cylindrical member 30. The pivot point 64 may also be provided with a friction device to prevent, hinder or allow pivoting between the first leg 52 relative to the cylindrical member 30.

The anchoring device 68 may take the form of a cable tie, e.g. wire tire, hose tie or zip tie, that may be configured to attach to the pivot point 64 at one end and at an opposite end, bind cables, lines or any other type of link that has been passed through the internal through bore 40 to the sensor 20. Additionally, the anchoring device 68 may cooperate with the pivoting locking member 66 to act as a hard stop when pivoting the first leg 52 relative to the cylindrical member 30. The anchoring device 68 may also be used as a reference point against reference marks on the first leg 52 to allow repeatable placement of the sensor 20 after any movement of the articulating sensor bracket assembly 10.

Figure 2:
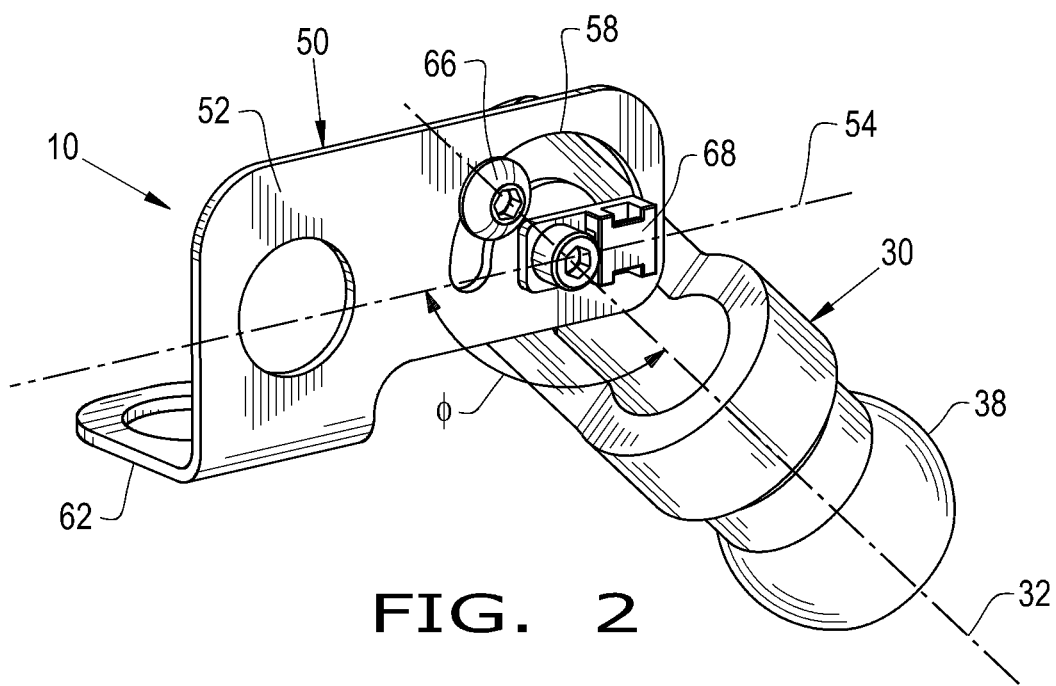
FIG. 2 is another perspective view of the articulating sensor bracket assembly of FIG. 1 arranged with the bracket at an obtuse angle relative to the cylindrical member.
Figure 3:
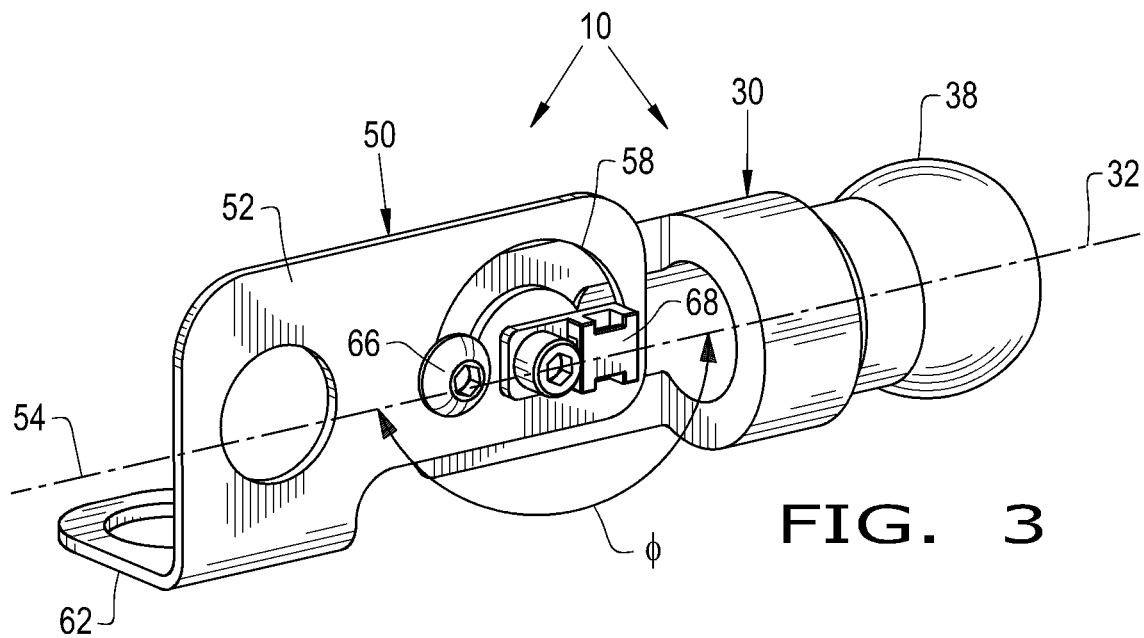
FIG. 3 shows another perspective view of the articulating sensor bracket assembly of FIG. 1 linearly positioned.
Figure 4:
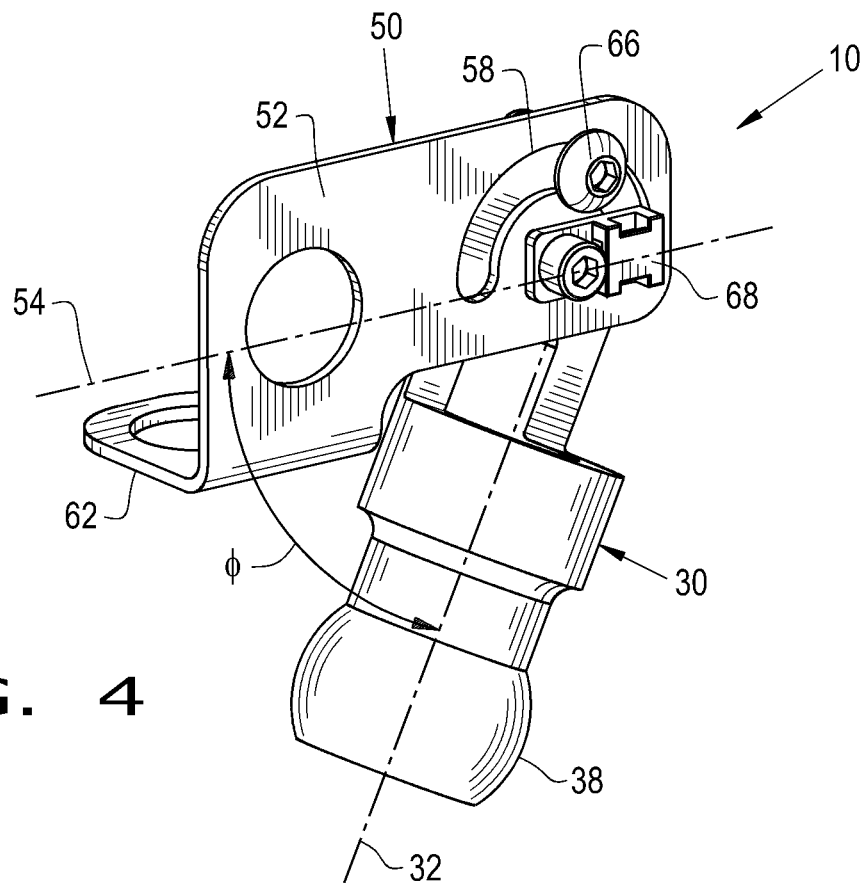
FIG. 4 shows another perspective of the articulating sensor bracket assembly of FIG. 1 arranged having an acute angle.

Referring now to FIGS. 2-4, there is shown the embodiment from FIG. 1 with the first angle (I) at an obtuse angle, with the centerline 54 and the longitudinal axis 32 aligning and the first angle (I) at an acute angle, respectively.

Figure 5:
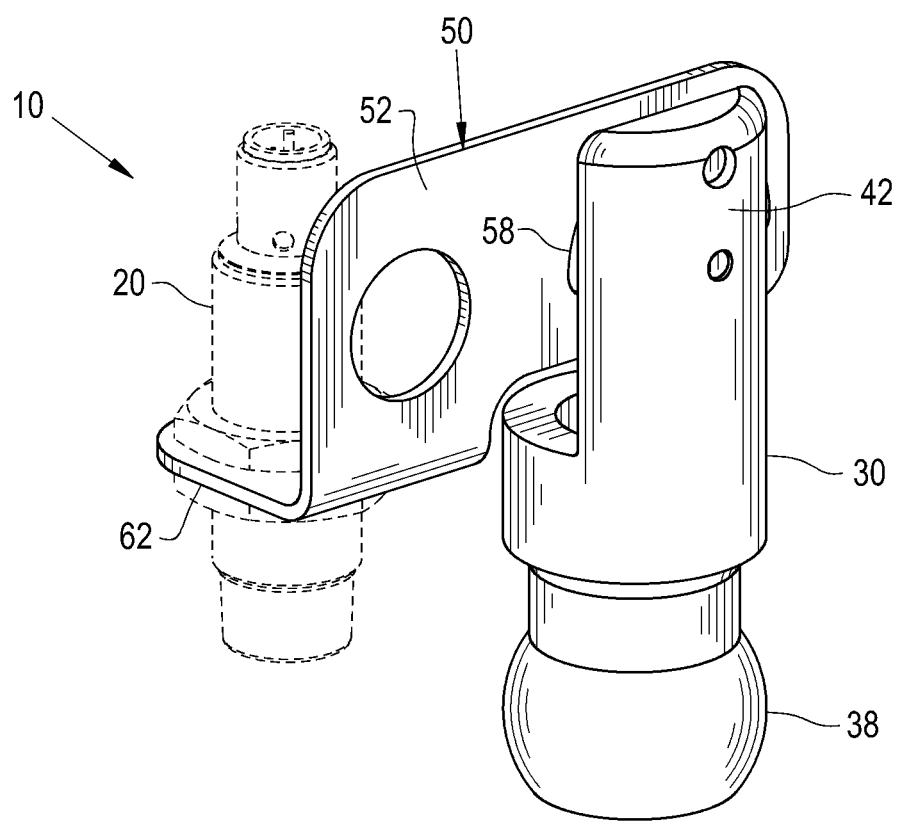
FIG. 5 is a perspective view of another embodiment of the articulating sensor bracket assembly, with the cylindrical member mounted on the opposite side of the bracket.

Referring now to FIG. 5, there is shown an embodiment wherein the first leg 52 is pivotably attached to the at least one extension 42 having the top surface of the first leg 52 is facing the at least one extension.

Figure 6:
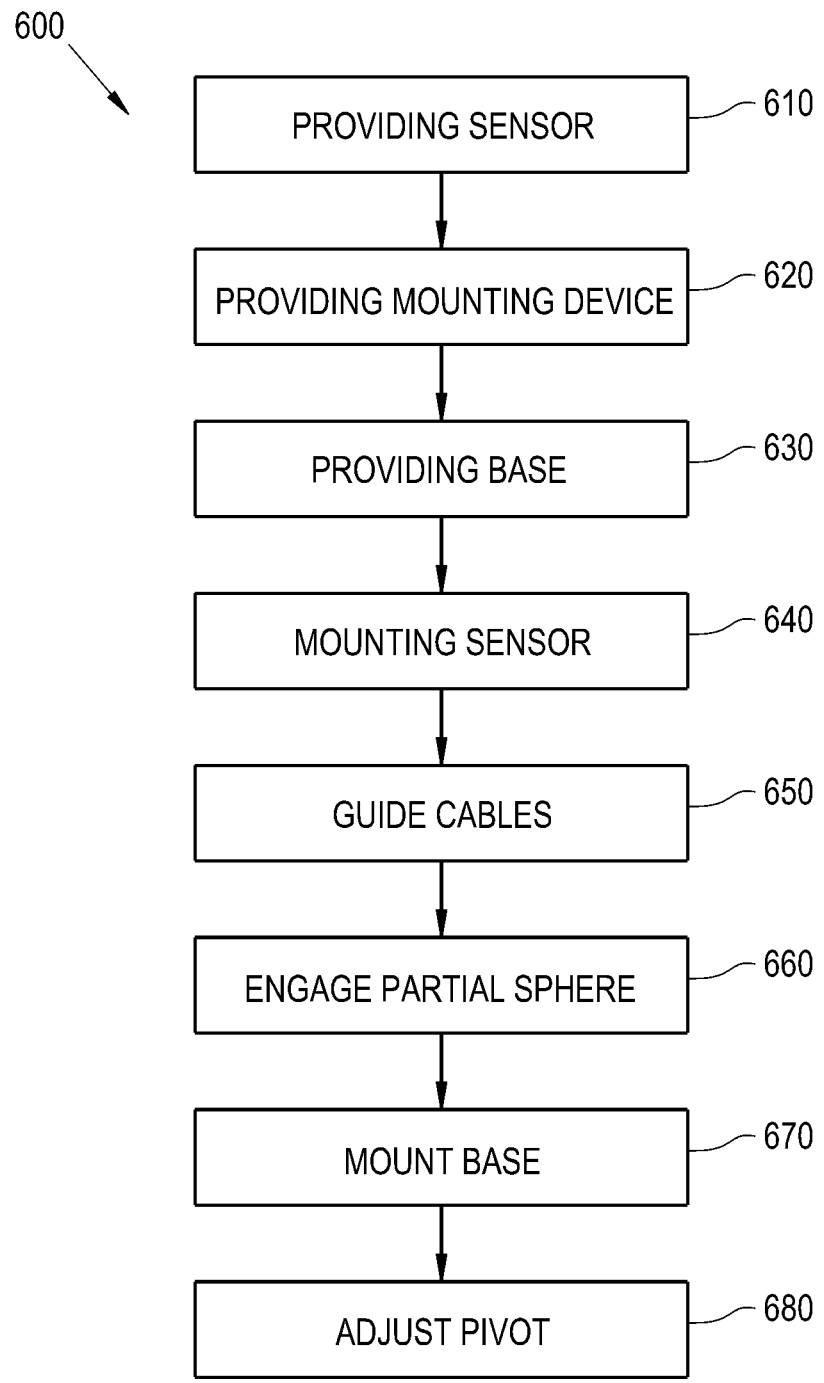
FIG. 6 is a flowchart of an embodiment of a method of the present invention for positioning a sensor.

Referring now to FIG. 6, there is shown a method 600 for positioning a sensor. The method generally includes the steps of providing a sensor having a mounting region and a cable (step 610). Providing a mounting device having a cylindrical member, an extension, a bracket, a pivoting point and a pivoting locking member. The cylindrical member having a body with an outer surface that forms a longitudinal axis from a first end to a second end. The second end forms at least a partial sphere configured for a first knuckle joint. The body forms an internal through bore aligned substantially parallel to the longitudinal axis. The extension extends from the first end of the cylindrical member. The bracket includes a top surface, a bottom surface, a first edge essentially parallel to a second edge and a third edge essentially parallel to a fourth side, the first edge and third edge traverse to each other. A centerline is formed between the first edge and the second edge. The bracket pivotably attaches to a pivot point near the fourth end of the extension. The centerline and the longitudinal axis forming a first angle therebetween. The bracket forms at least one bracket mounting point. The pivoting locking member is arranged near the pivot point (step 620). Providing a base configured to engage the at least partial sphere and a mounting surface. The base includes a channel to guide the cable (step 630). Mounting the sensor to the bracket or the arm (step 640). Guiding the cable through the internal through bore. Guiding the cable through the base channel (step 650). Engaging the at least partial sphere with the base (step 660). Mounting the base to a mounting surface (step 670). Adjusting the pivot and the pivoting locking member for positioning (step 680).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An articulating sensor bracket assembly, comprising:
   a generally cylindrical member having a first end and a second end, the cylindrical member having a longitudinally extending through bore defining a longitudinal axis, the first end defining a ball arrangement and the second end defining a mounting surface, the mounting surface being disposed generally parallel to the longitudinal axis;
   an L-shaped bracket having a first leg and a second leg, the first leg being disposed generally perpendicular to the second leg, the first leg including a mounting hole and an arcuate slot extending partially around the mounting hole, the second leg including a sensor mounting hole;
   a first fastener disposed within the mounting hole and coupled with the mounting surface; and
   a second fastener disposed within the arcuate slot and coupled with the mounting surface.

2. The articulating sensor bracket assembly of claim 1, wherein the L-shaped bracket can pivot 180 degrees about the cylindrical member.

3. The articulating sensor bracket assembly of claim 1, wherein the first fastener includes an anchoring device.

4. The articulating sensor bracket assembly of claim 3, wherein the anchoring device is an offset cable tie anchor.

5. The articulating sensor bracket assembly of claim 1, wherein the sensor mounting hole is 0.315"-1.18" or 8 mm-30 mm.

6. The articulating sensor bracket assembly of claim 1, wherein the first fastener is further provided with a wave washer.

7. A method for positioning a sensor, comprising:
   providing a sensor having a mounting region and a cable;
   providing an articulating mounting device having a generally cylindrical member having a first end and a second end, the cylindrical member having a longitudinally extending through bore defining a longitudinal axis, the first end defining a ball arrangement and the second end defining a mounting surface, the mounting surface being disposed generally parallel to the longitudinal axis, a bracket having a first leg and a second leg, the first leg being disposed generally perpendicular to the second leg, the first leg including a mounting hole and an arcuate slot extending partially around the mounting hole, the second leg including a sensor mounting hole, a first fastener disposed within the mounting hole and coupled with the mounting surface and a second fastener disposed within the arcuate slot and coupled with the mounting surface;

providing a base configured to engage the ball arrangement and a base mounting surface, the base including a channel to guide the cable;
mounting the sensor to the articulating mounting device;
guiding the cable through the through bore;
guiding the cable through the channel of the base;
engaging the ball arrangement with the base;
mounting the base to the base mounting surface; and
adjusting the first fastener and the second fastener for positioning.

8. The method of claim 7, wherein the bracket can pivot 180 degrees about the cylindrical member.

9. The method of claim 7, wherein the first fastener includes an anchoring device.

10. The method of claim 9, wherein the anchoring device is an offset cable tie anchor.

11. The method of claim 7, wherein the sensor mounting hole is 0.315"-1.18" or 8 mm-30 mm.

12. The method of claim 7, wherein the first fastener is further provided with a wave washer.

13. An articulating mounting device, comprising:
a generally cylindrical member having a first end and a second end, the cylindrical member having a longitudinally extending through bore defining a longitudinal axis, the first end defining a ball arrangement and the second end defining a mounting surface, the mounting surface being disposed generally parallel to the longitudinal axis;
an L-shaped bracket having a first leg and a second leg, the first leg being disposed generally perpendicular to the second leg, the first leg including a mounting hole and an arcuate slot extending partially around the mounting hole, the second leg including a sensor mounting hole;
a first fastener disposed within the mounting hole and coupled with the mounting surface;
a second fastener disposed within the arcuate slot and coupled with the mounting surface;
a knuckle joint forming a cylindrical sleeve with a distal and a proximal end, the distal end partially covering the ball arrangement; and
a base configured to engage the ball arrangement and a base mounting surface, the base including a channel configured to guide a cable.

* * * * *

UNITED STATES PATENT AND TRADEMARK OFFICE
CERTIFICATE OF CORRECTION

PATENT NO. : 10,801,664 B1
APPLICATION NO. : 16/373869
DATED : October 13, 2020
INVENTOR(S) : Nighswander et al.

It is certified that error appears in the above-identified patent and that said Letters Patent is hereby corrected as shown below:

In the Specification

Column 4
At Line 29, please delete "angle (I)", and substitute therefore --angle $\phi$--;
At Line 31, please delete "angle (I)", and substitute therefore --angle $\phi$--;
At Lines 37-38, please delete "angle (I)", and substitute therefore --angle $\phi$--;
At Line 57, please delete "angle (I)", and substitute therefore --angle $\phi$--; and
At Line 60, please delete "angle (I)", and substitute therefore --angle $\phi$--.

Column 5
At Line 36, please delete "angle (I)", and substitute therefore --angle $\phi$--; and
At Line 38, please delete "angle (I)", and substitute therefore --angle $\phi$--.

Signed and Sealed this
Twenty-fifth Day of October, 2022

Katherine Kelly Vidal
*Director of the United States Patent and Trademark Office*